US006857490B2

(12) United States Patent
Quigg (10) Patent No.: US 6,857,490 B2
(45) Date of Patent: Feb. 22, 2005

(54) STAIR-CLIMBING WHEELCHAIR

(76) Inventor: Robert T. Quigg, 118 Hickory Dr., Hatfield, PA (US) 19440

( * ) Notice: Subject to any disclaimer, the term of this patent is extended or adjusted under 35 U.S.C. 154(b) by 0 days.

(21) Appl. No.: 10/316,717

(22) Filed: Dec. 11, 2002

(65) Prior Publication Data

US 2003/0116927 A1 Jun. 26, 2003

Related U.S. Application Data

(60) Provisional application No. 60/339,538, filed on Dec. 11, 2001.

(51) Int. Cl.[7] .............................................. B62D 55/04
(52) U.S. Cl. .................... 180/9.28; 180/9.32; 280/5.22; 305/191
(58) Field of Search ................................ 180/907, 9.21, 180/9.26, 9.28, 9.3, 9.32; 280/5.22, DIG. 10; 305/116, 124, 125, 126, 130, 134, 151, 152, 133, 136, 191

(56) References Cited

U.S. PATENT DOCUMENTS

| 2,141,421 A | * | 12/1938 | Taylor ........................... 305/51 |
| 2,665,175 A | * | 1/1954 | Miller ........................... 305/151 |
| 2,751,027 A | | 6/1956 | McLaughlin ................ 180/9.1 |
| 3,191,953 A | | 6/1965 | Aysta ........................ 280/5.22 |
| 3,231,290 A | * | 1/1966 | Wyer ........................ 280/5.22 |
| 3,276,531 A | * | 10/1966 | Hale ........................... 180/9.23 |
| 3,288,234 A | | 11/1966 | Feliz ........................... 180/6.5 |
| 3,529,688 A | | 9/1970 | Bruce ........................... 180/6.7 |
| 4,044,850 A | | 8/1977 | Winsor ..................... 180/9.2 C |
| 4,061,199 A | | 12/1977 | Last ............................. 180/8 A |
| 4,077,483 A | * | 3/1978 | Randolph ..................... 180/6.5 |
| 4,155,588 A | * | 5/1979 | Danziger et al. ........... 297/115 |
| 4,401,178 A | | 8/1983 | Studer ......................... 180/8 A |
| 4,566,551 A | | 1/1986 | Feliz ............................ 180/9.1 |
| 4,566,707 A | | 1/1986 | Nitzberg ..................... 180/8.2 |
| 5,033,000 A | * | 7/1991 | Littlejohn et al. ............ 701/36 |
| 5,158,309 A | | 10/1992 | Quigg ........................ 280/5.22 |
| 5,335,741 A | | 8/1994 | Rabinovitz et al. .......... 180/8.2 |
| 5,338,048 A | | 8/1994 | Medina ...................... 280/5.22 |
| 5,395,129 A | | 3/1995 | Kao .......................... 280/5.22 |
| 5,423,563 A | | 6/1995 | Wild ........................ 280/250.1 |
| 5,577,567 A | * | 11/1996 | Johnson et al. ............. 180/9.23 |
| 6,003,624 A | | 12/1999 | Jorgensen et al. ........... 180/6.5 |
| 6,154,690 A | * | 11/2000 | Coleman ........................ 701/1 |
| 6,237,705 B1 | | 5/2001 | Nakatani et al. ............. 180/8.2 |
| 2003/0033671 A1 | * | 2/2003 | Robbins .................... 5/81.1 R |

* cited by examiner

Primary Examiner—Anne Marie Boehler
(74) Attorney, Agent, or Firm—Howson and Howson (57) ABSTRACT

A stair-climbing wheelchair has a pair of track assemblies that can be placed in an operative drive mode to propel the wheelchair along ascending and descending paths of travel relative to an obstacle such as a stairway, curb, or the like. Each track assembly includes a guide member with rollers at opposite ends thereof carrying an endless cleated belt. The guide member is arched between its end sections thereby permitting the endless belt to deflect upwardly between the rollers when the endless belt engages an obstacle such as a step, curb or the like. This permits a smooth gradual transition of the wheelchair onto and/or off the top step of a staircase. Preferably, each track assembly also includes an inclined tail section having a separate endless cleated belt. The track assemblies can also be utilized in connection with remote control and/or unmanned motorized vehicles.

23 Claims, 4 Drawing Sheets

FIG. 5

STAIR-CLIMBING WHEELCHAIR

CROSS REFERENCE TO RELATED APPLICATION

This application claims the benefit of priority of co-pending U.S. Provisional Patent Application No. 60/339,538 filed on Dec. 11, 2001.

FIELD OF THE INVENTION

The present invention relates to a motorized device that can readily traverse obstacles, such as, stairs, curbs and the like, and more particularly, the present invention relates to a wheelchair that readily and safely enables wheelchair bound individuals to independently ascend and descend stairs, curbs, and like obstacles without assistance from another individual, that enables a smooth transition onto and off the top step of a stairway, and that includes various other improvements providing a wheelchair user with a multi-functioning, long-lasting, reliable wheelchair.

BACKGROUND OF THE INVENTION

Conventional wheelchairs include a chair that has a footrest and armrests and that is supported by a pair of rear drive wheels and a pair of front caster wheels. The rear wheels can be manual or power driven to propel the wheelchair along a flat horizontal surface or a flat surface which is slightly inclined to the horizontal. A powered wheelchair typically includes at least one battery-powered motor for driving the rear wheels and has a wheelchair driving control mechanism, such as a joystick, located on one of the armrests.

It is known to provide wheelchairs with so-called "track" stair-climbing assemblies which can be positioned between operative and inoperative positions. In use, such track assemblies function similar to that which is utilized to propel conventional bulldozers or military tanks. For instance, as disclosed in U.S. Pat. No. 5,158,309 issued to the applicant of the present application, Robert T. Quigg, a pair of identical, straight, elongate track assemblies extend between and are parallel to the wheels of the wheelchair and can be positioned into an operative position which can engage the outer corner edges, or tips, of steps, curbs and like obstacles to permit the wheelchair to safely ascend and descend such obstacles. For example, see FIG. 2 of the '309 patent.

Another example of a stair-climbing wheelchair is disclosed by U.S. Pat. No. 3,529,688 issued to J. W. Bruce. The wheelchair disclosed by the '688 patent has a pair of track assemblies which each include a powered, gear-driven, cleated belt to transport a wheelchair up and down stairs. Each track includes front and rear sections that are capable of pivoting relative to each other to enable the track assembly to adjust to the slope of the stairs. For example, see FIGS. 1–7 of the '688 patent which best discloses the pivoting relationship between the front and rear sections of the track assembly.

A further example of a stair-climbing wheelchair having a track assembly is disclosed by U.S. Pat. No. 5,395,129 issued to Kao. Each track is made of four separate endless cleated belts positioned in an end-to-end relationship. The inner belts are aligned on a common plane whereas the front and rear belts are pivot-able upwardly between at least 0° to 45° from a common imaginary plane extending through the inner belts. For instance, see FIGS. 8A and 8B of the Kao patent. The stated purpose of the inclination of the front and rear sections is to allow the wheelchair to negotiate stairs more easily. (See column 2, lines 10–14, of the Kao patent.)

A still further example of a stair-climbing wheelchair is disclosed by U.S. Pat. No. 5,335,741 which issued to Rabenovitz et al. and which discloses a track construction including separate front and rear sections that pivot relative to each other. For example, compare the relationship of the front and rear track sections illustrated in FIGS. 2A, 8 and 9 of the Rabenovitz patent. Each rear track section includes a permanently upwardly angled tail piece, and each track is power driven via a worm gear. In addition, the wheelchair disclosed by the Rabenovitz patent includes sensors to determine whether or not a stairway is too steep and whether or not the wheelchair is properly aligned and square with the stairway. For example, see column 10, line 52, to column 11, line 15, of the Rabenovitz patent.

Other examples of stair-climbing wheelchairs are disclosed by U.S. Pat. No.: 2,751,027 issued to McLaughlin; U.S. Pat. No. 3,191,953 issued to Aysta; U.S. Pat. Nos. 3,288,234 and 4,566,551 issued to Feliz; U.S. Pat. No. 4,044,850 issued to Winsor; U.S. Pat. No. 4,061,199 issued to Last; U.S. Pat. No. 4,401,178 issued to Studer; U.S. Pat. No. 4,566,707 issued to Nitzberg; U.S. Pat. No. 5,338,048 issued to Medina; U.S. Pat. No. 5,423,563 issued to Wild; U.S. Pat. No. 6,003,624 issued to Jorgensen et al., and U.S. Pat. No. 6,237,705 issued to Nakatani.

The typical stair-climbing wheelchair drops forward in a sudden motion when entering onto a staircase from a landing thereof. To this end, when the center of gravity of the wheelchair and occupant passes over the edge, or tip, of the top step, the wheelchair quickly and suddenly transitions from a horizontal position on the landing to an inclined position determined by the slope extending through the tips of the steps. This sudden drop/transition experienced by the occupant is uncomfortable and undesired. A similar sudden transition occurs at the top of the stairway when exiting from the steps onto the landing. There exists a need for a stair-climbing wheelchair that enables a smooth transition between a horizontal position and an inclined position of the wheelchair without any dropping or like sudden movements.

Although the aforementioned stair-climbing wheelchairs may function in a satisfactory manner for their intended purposes, there is a need for an improved wheelchair that enables ready, safe and comfortable descending and ascending of stairs, curbs and like obstacles and that provides other advantages over conventional wheelchairs. The wheelchair should enable smooth transitions onto and off steps adjacent the top step of a stairway and should include safety features to prevent the wheelchair from attempting to descend/ascend stairways which are determined to be to steep or in which the wheelchair is not properly aligned. The wheelchair should also permit ready wireless communication and should enable the location of the wheelchair to be readily determined via global satellite positioning (GPS) systems and the like for security purposes. In addition, the wheelchairs should permit ease of transfer of an individual into and out of the wheelchair, should provide a smooth ride whether or not in an ascending/descending mode, and should be sturdy, long-lasting, easy to control and inexpensive to manufacture and maintain.

OBJECTS OF THE INVENTION

With the foregoing in mind, a primary object of the present invention is to provide a manned, or unmanned, motorized vehicle capable of ascending and descending obstacles, such as, stairs, curbs or the like in a safe and reliable manner.

Another object of the present invention is to provide a stair-climbing wheelchair that provides a smooth transition between the horizontal landing at the top of the staircase and the inclined slope of a staircase defined by the plane extending through the tips of the steps of the staircase.

Another object of the present invention is to provide a stair-climbing wheelchair which is easy to operate and control and which provides safety features to prevent the wheelchair from ascending/descending overly steep obstacles or obstacles to which the wheelchair is not properly aligned.

A further object of the present invention is to construct a stair-climbing wheelchair such that the wheelchair is sturdy, long-lasting and easy to control and operate.

A still further object of the present invention is to provide a wheelchair with ready wireless communication, GPS tracking, and 911 emergency call capabilities.

Yet another object of the present invention is to provide a wheelchair that permits ease of transfer of an individual into and out of the wheelchair and that provides a smooth ride in an ascending/descending or normal operation mode.

SUMMARY OF THE INVENTION

More specifically, the present invention is a stair-climbing wheelchair having a seat, a frame supporting the seat, a set of wheels on which the wheelchair is propelled during normal operations, and a pair of identical track assemblies on which the wheelchair is propelled when descending and ascending obstacles, such as, steps, curbs and the like. The track assemblies are spaced-apart, mounted to the frame underneath the seat between the set of wheels, and extend in a front to back direction relative to the wheelchair. In an inoperative storage position, the track assemblies are spaced above a ground surface on which the wheelchair is supported, and in an operative drive position, the track assemblies engage a ground surface on which the wheelchair is supported for purposes of transporting the wheelchair along a path of travel to thereby enable the wheelchair to descend and ascend an obstacle such as steps, curbs and the like.

Each of the track assemblies includes an elongate guide member carrying an endless belt. Each guide member has front and rear end sections each supporting a roller over which the endless belt is mounted for rotation. The guide member is upwardly arched between its front and rear end sections thereby permitting the endless belt to deflect upwardly between the rollers when the endless belt engages an obstacle such as a corner or tip of a step, curb or the like. Thus, the endless belts conform to the contour of a top step and permit a smooth, gradual and continuous transition between horizontal and inclined wheelchair positions so that no sudden, unsettling movements are experienced during the transition.

Preferably, at least one of the rollers in each track assembly is movably mounted on its guide member to provide the endless belt with an amount of slack to enable the endless belt to deflect upwardly between the rollers. Preferably, each of the movable rollers is resiliently biased by a spring mechanism so that the endless belts are maintained in a taut condition at all times including when the belts are in an upward deflected position.

Preferably, each of the track assemblies includes an upwardly inclined tail section that extends from the rear end section of the arched elongate guide member and that includes a pair of rollers about which an endless belt revolves. Preferably, the endless belt in the arched guide member and the endless belt in the tail section are separate belts, and one of the rollers of the arched guide member and one of the rollers of the tail section rotate about a common axis. In addition, preferably the tail section of each track assembly is offset inwardly of its corresponding arched guide member such that the tail sections of the track assemblies are spaced closer together than the arched guide members of the track assemblies.

Preferably, the frame of the wheelchair includes a pair of X-shaped members that permit the wheels of the wheelchair to be positioned in a retracted position to place the track assemblies in an operative drive condition. The X-shaped members interconnect the wheels of the wheelchair to the wheelchair seat, and each X-shaped member includes a pair of legs that pivot at an interconnection thereof in a scissors like motion. Thus, the wheels of the wheelchair can be extended below the track assemblies to place the track assemblies in the inoperative storage condition and can be retracted above the track assemblies to place the track assemblies in the operative drive condition. Preferably, the X-shaped members are caused to be expanded or retracted by a powered cylinder located under the seat, and preferably, the legs of the X-braces interconnect substantially directly above a peak of the upwardly arched guide members.

Preferably, the endless belts each have a plurality of outwardly extending cleats. In one alternate contemplated embodiment, each cleat has a section that pivots so that the cleat grips a corner of the obstacle, such as a step being traversed.

The track assemblies include sensors to determine whether or not a slope of the path of travel is too steep for safe passage and automatic controls for preventing further advancement of the wheelchair along the path of travel if the slope is determined to be too steep for safe passage. The track assemblies also include sensors to determine whether or not the wheelchair is in proper alignment with respect to a stairway to safely descend/ascend the stairway and automatic controls for preventing further advancement of the wheelchair along the path of travel if the wheelchair is determined not to be in proper alignment with the stairway.

According to another aspect of the present invention, a wheelchair is provided with a wireless or cellular phone built into one of the armrests of the wheelchair.

According to a further aspect of the present invention, a wheelchair is provided with a transfer board that is permanently secured to the wheelchair. To this end, the transfer board can be formed by a part of the armrest of the wheelchair that can be folded between a vertically disposed storage position and a horizontally disposed operative position.

Preferably, the stair-climbing wheelchair of the present invention includes a control unit mounted on one of the armrests of the wheelchair, and the control unit has a joystick that provides controls to drive both power driven rear wheels of the wheelchair and the track assemblies. In addition, preferably the control unit includes low battery lights, ascending/descending status lights, and at least one of a mileage counter and a hour usage counter. The control unit can also include a breath analyzer unit, and the wheelchair can include hand bars with an override control unit and can be assembled with tamper resistant fasteners that require a unique tool to unfasten.

According to a further aspect of the present invention, the track assemblies are utilized on a remote control or unmanned device used to traverse obstacles. Such devices may find use in the exploration of planets or areas having unsafe or rocky terrain, in mine field cleaning operations, in remote control bomb squad operations, and the like.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENTS

Before explaining the preferred embodiments of the present invention in detail, it is to be understood that the present invention is not limited in its application to the details of construction and arrangement of parts illustrated in the accompanying drawings, since the invention is capable of other embodiments and of being practiced and carried out in various ways. Also it is to be understood that the phraseology and terminology employed herein are for the purpose of description and not limitation.

Figure 1:
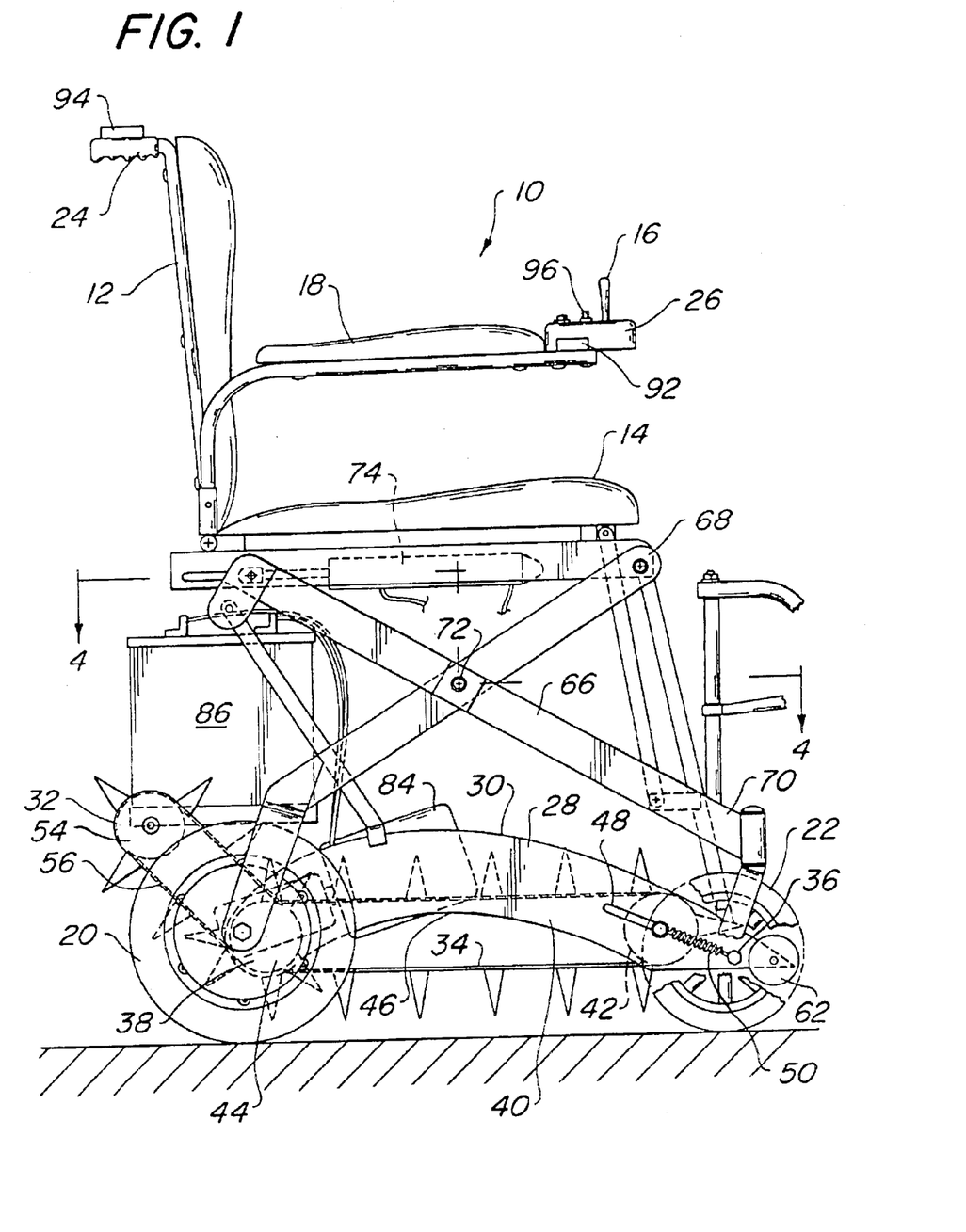
FIG. 1 is a side elevational view of a wheelchair embodying the present invention, the stair-climbing track assemblies being in a non-operative mode.

FIG. 1 illustrates a wheelchair 10 which in many ways is similar to conventional non-stair-climbing wheelchairs. To this end, the wheelchair 10 has a frame 12 providing a seat 14 and a pair of armrests 18 for comfortably accommodating a wheelchair user. A pair of rear wheels 20 and a pair of front wheels 22 are interconnected to the frame 12 for providing the wheelchair 10 with a means of propelling the wheelchair 10 along a flat horizontal or slightly inclined surface. The wheelchair 10 can be driven manually, such as, by a second individual utilizing hand bars 24 extending from the rear of the frame 12 to push/pull the wheelchair 10 in a given direction. The wheelchair 10 can include battery powered motors that drive the rear wheels 20 and that are controlled by the wheelchair user. In this case, a control panel 26 having a joystick 16 or like control device is utilized to control the movement of the wheelchair 10.

Figure 2:
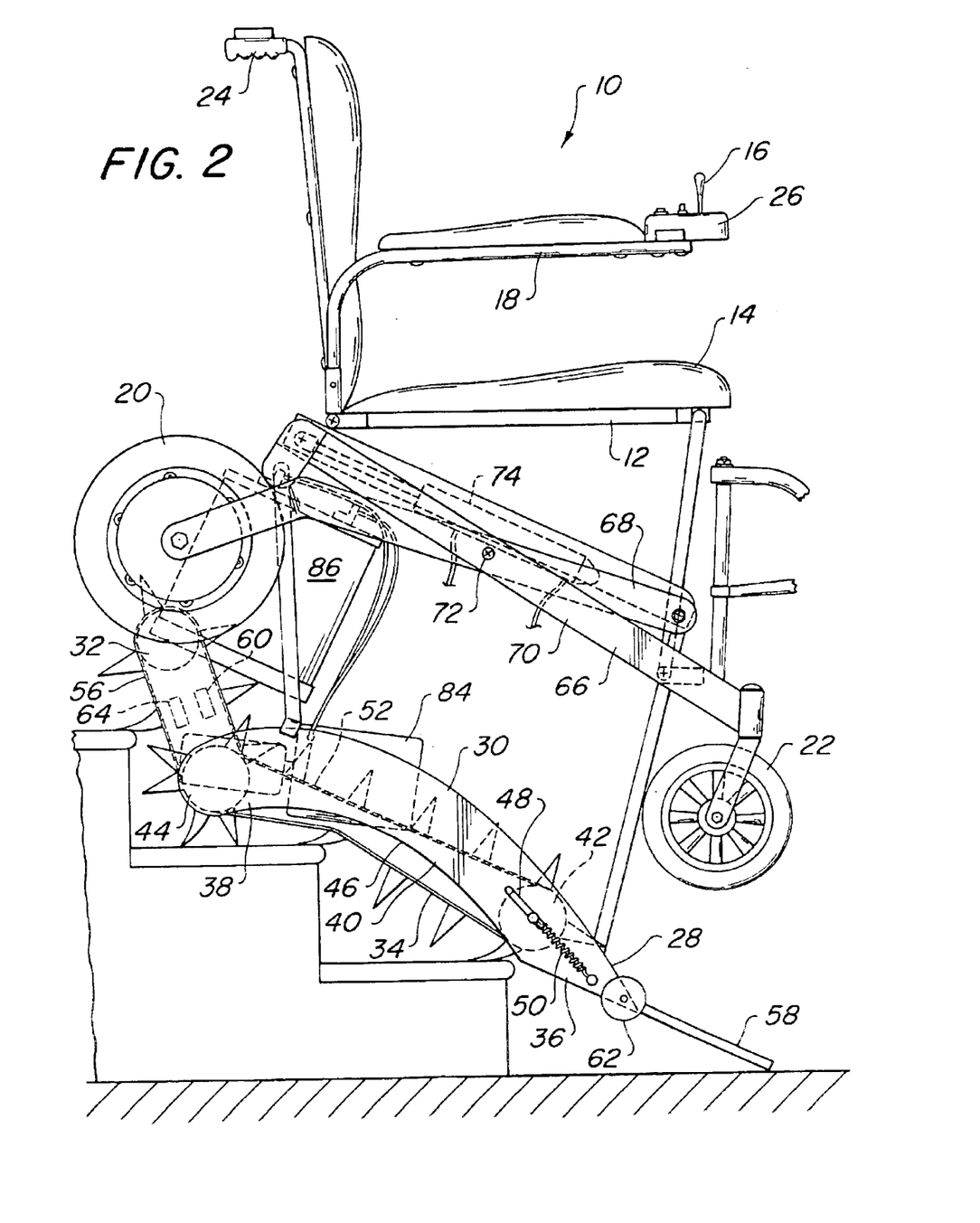
FIG. 2 is a side elevational view of the wheelchair in FIG. 1 with the stair-climbing track assemblies positioned in an operative mode traversing steps.

The wheelchair 10 according to the present invention provides the user with the ability to ascend and descend steps, curbs and like obstacles and includes a pair of track assemblies 28 for use during an ascending or descending mode of operation. The track assemblies 28 are similar in some basic ways to the track assemblies disclosed in U.S. Pat. No. 5,158,309 issued to the inventor of the present invention, Robert T. Quigg. The disclosure of the '309 patent is herein incorporated by reference. To this end, the pair of track assemblies 28 are elongate and extend in a front to back direction relative to the wheelchair 10, are parallel and spaced apart, and are located underneath the seat 14 between the wheels of the wheelchair 10. For example, see FIG. 4. In addition, the track assemblies 28 can be placed in an inoperative, or storage, condition as best illustrated in FIG. 1 in which the track assemblies 28 are a spaced distance above a flat surface on which the wheelchair 10 is supported, or in an operative drive condition as illustrated in FIG. 2 in which the track assemblies engage the underlying surface and are utilized to propel the wheelchair 10 in a forward or rearward direction of travel across an obstacle.

The track assemblies 28 of the present invention include many novel features relative to the track assemblies disclosed in the '309 patent. Preferably, each track assembly 28 includes an arched guide member 30 extending under the seat 14 of the wheelchair 10 and an upwardly inclined tail section 32 extending rearwardly therefrom. Preferably, each of the arched guide member 30 and inclined tail section 32 of each track assembly 28 carries its own set of rollers about which an endless cleated belt is mounted. Thus, separate belts are carried by each of the arched guide member 30 and inclined tail section 32 of each track assembly 28. Alternatively, a single cleated endless belt can extend the entire length of each elongate track assembly through both the arched guide member and tail section.

One of the novel features of the present invention is that the arched guide member 30 permits its endless belt 34 to deflect upwardly and conform to the shape of the top step of the obstacle being traversed. For example, see the upward deflection of belt 34 as illustrated in FIG. 2. Each guide member 30 has a front end section 36, a rear end section 38, and an upwardly arched section 40 extending therebetween that provides the desired space for the upward deflection of the belt 34. Preferably, a roller 42 is mounted on the front end section 36, a second roller 44 is mounted on the rear end section 38, and the belt 34 is mounted thereon and extends therebetween, whereby rotation of the rollers, 42 and/or 44, causes rotation of the belt 34.

The belt 34 deflects upwardly when the belt 34 engages a top step of a staircase at a location on the belt 34 between the rollers, 42 and 44. A minimum amount of upward deflection occurs when the step is engaged adjacent the rollers, 42 or 44, and a maximum amount of upward deflection occurs at the center, or peak, 46 of the arched section 40 midway between the rollers, 42 and 44. The amount of deflection follows a generally arcuate curve substantially matching the contour of the arched section 40. The deflection enables the wheelchair 10 to transition in a smooth and gradual manner between a substantially horizontal orientation on a landing at the top of a staircase and an inclined orientation on the stairs. The upward deflection of the belt 34 along an arched path eliminates any sudden dropping or movement of the wheelchair when its center of gravity passes the tip of the top step.

Preferably, at least one of the rollers, 42 or 44, on each of the arched guide members 30 is movably mounted to the guide member 30 to provide the belt 34 with slack needed for the upward deflection of the belt 34. For example, the roller 42 can be connected to the guide member 30 via a slotted connection 48 and can be connected to a spring 50 or like mechanism to resiliently bias the roller 42 in a direction opposite the other roller 44. For example, see FIG. 2. Thus, the spring 50 maintains the belt 34 in a taut condition on the rollers, 42 and 44, such that the belt 34 normally extends in a substantially straight line path between the rollers, 42 and 44. However, when the belt 34 engages a top step, the roller 42 is urged rearwardly against the force of the spring 50 to enable the belt 34 to deflect upwardly out of its normal straight line path. Another tensioning mechanism (not shown) can work in concert with the spring 50 and deflect the top section 52 of the belt 34 upward to ensure that the belt 34 remains taut on the rollers, 42 and 44, at all times including when the belt 34 is deflected upwardly.

Another novel feature of the track assembly 28 according to the present invention is that it includes an upwardly angled tail section 32 extending from the arched guide member 30. The upward angle of the tail section 32 enables the track assemblies 28 to readily and reliably engage a lowermost step to initiate an ascending mode of operation and enables the track assemblies 28 to smoothly disengage a lowermost step in a descending mode of operation. In addition, the tail sections 32 enable a ready determination of whether or not the wheelchair 10 is properly aligned to the stairway in an ascending mode of operation and provides the function of a wheely-bar when the track assemblies 28 are in an inoperative storage condition thereby preventing the wheelchair 10 from tipping over backwards should the front of the wheelchair 10 become unexpectedly elevated.

Figure 4:
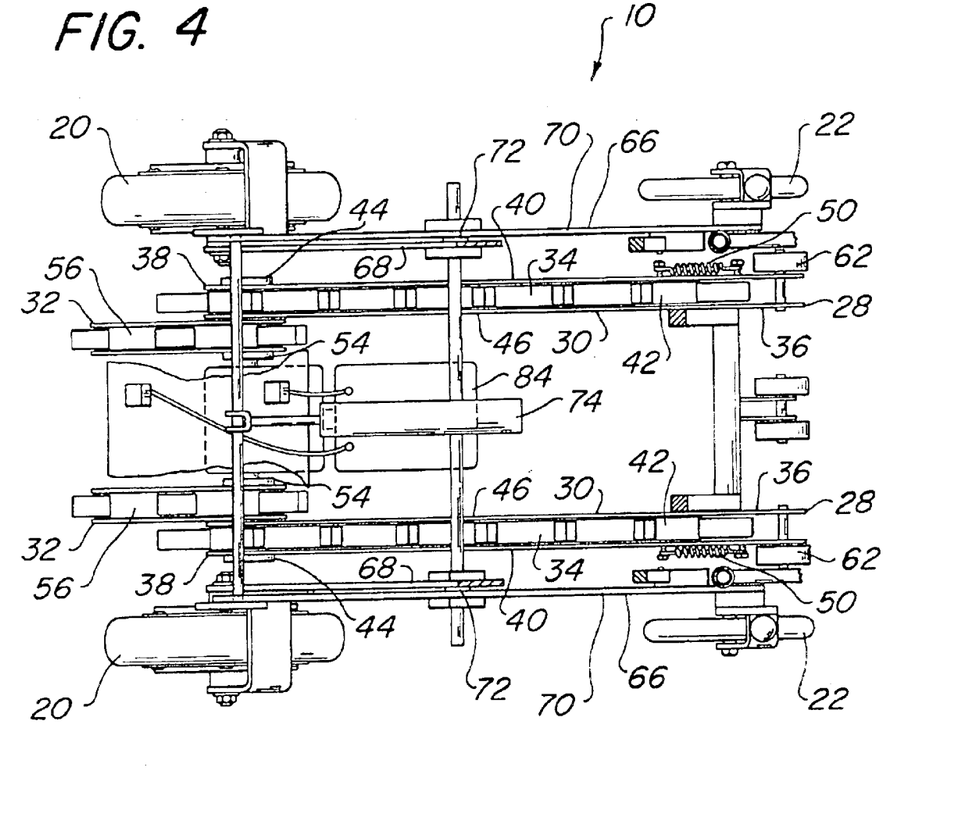
FIG. 4 is a bottom plan view of the wheelchair in FIG. 1 with the stair-climbing track assemblies in a non-operative mode.

Each tail section 32 has a set of rollers 54 about which an endless cleated belt 56 is mounted for rotation. Preferably, each tail section 32 is offset inward relative to its corresponding arched guide member 30, and preferably, the roller 44 on the rear end section 38 of the guide member 30 and one of the rollers 54 of the tail section 32 are located side-by-side and rotate about a common axis of rotation. Thus, as best illustrated in FIG. 4, the tail sections 32 of the pair of track assemblies 28 are spaced closer together than the arched guide members 30 of the pair of track assemblies 28.

Preferably, the track assemblies 28 include a set of sensors for determining whether or not an obstacle is too steep for the wheelchair 10 to safely ascend/descend the obstacle. For example, a front end sensor 58 can be provided at the front of the wheelchair 10 such that it can be extended and deployed onto the steps at the top of a stairway before the wheelchair 10 enters onto the stairs to determine the slope gradient of the uppermost steps of the stairway. If the sensor 58 determines that the slope gradient is too steep for safe travel, advancement of the wheelchair 10 onto and down the steps is prevented. Likewise, preferably a second sensor 60, such as a floating mercury switch, is located adjacent the rear of the wheelchair 10 and determines the slope gradient at the lowermost steps of a stairway when the wheelchair 10 is in an ascending mode of operation. As the wheelchair 10 begins to ascend the steps and as the wheelchair 10 becomes further inclined, the floating mercury switch 60 determines whether or not an unsafe slope gradient has been reached and, if so, will prevent further advancement of the wheelchair 10 up the steps and will return the wheelchair 10 down off the steps.

The track assemblies 28 also include a novel set of sensors for determining whether or not the wheelchair 10 is square and properly aligned with a stairway or like obstacle in an ascending/descending operation. Preferably, each front end section 36 of the arched guide member 30 includes a roller 62 or the like which drops downwardly under the force of gravity, or alternatively discontinues rotation, as it passes over the edge of the uppermost step of a stairway during a descending mode of operation. If the roller 62 of each track assembly 28 drops at substantially the same time, or within a preset time limit, the wheelchair 10 recognizes that it is square and properly aligned with the stairway and thereafter permits the wheelchair 10 to enter onto the uppermost step of the stairway. Alternatively, if the rollers 62 do not drop substantially at the same time, this indicates that the wheelchair 10 is approaching the steps at an angle and that a descending operation would be unsafe. In this case, forward motion of the wheelchair 10 is temporarily shut down, and the user must back up and try again.

A similar function is accomplished in an ascending mode of operation in which the relative contact of the tail sections 32 with the lowermost step is monitored and compared to determine whether or not the wheelchair 10 is properly aligned with the lowermost step of the stairway. For example, a contact sensor 64 can be located within each tail section 32 and is activated when the tail section 32 presses against the lowermost step. If the sensors 64 are depressed at substantially the same time, or within a preset time limit, the wheelchair 10 recognizes that it is square and properly aligned with the stairway and thereafter, permits the wheelchair 10 to enter onto the lowermost step of the stairway. Alternatively, if the sensors 64 are not depressed at substantially the same time, this indicates that the wheelchair 10 is approaching the steps at an angle and that an ascending operation would be unsafe. In this case, the user must move away from the steps and then try again.

All of the above referenced features can best be understood by a description of the sequence of operation during an ascending/descending event. The wheelchair 10 according to the present invention always faces down the set of stairs whether in an ascending mode or a descending mode of operation. See FIG. 2. For instance, the wheelchair would travel in a forward direction during a descending operation and in a rearward direction during an ascending operation. In addition, the seat 14 of the wheelchair 10 is tilted rearwardly relative to the track assemblies 28 so that, when the track assemblies are placed in the operative drive condition, the user is prevented from falling forward when the track assemblies 28 are oriented to the slope of the stairway. See FIG. 2.

In a normal mode of operation on a flat surface, the wheels, 20 and 22, of the wheelchair 10 extend below the track assemblies 28, and thus, the track assemblies 28 are located in the storage condition as illustrated in FIG. 1. In this condition, the seat 14 of the wheelchair 10 is substantially level with the flat surface. When an obstacle such as a stairway is to be traversed with the wheelchair 10, the wheels, 20 and 22, are retracted above the track assemblies 28, and thus, the track assemblies 28 are located in an operative ground-contacting position. In this situation, the seat 14 is tilted rearwardly relative to the surface on which the wheelchair 10 is supported.

In a descending operation, the front end sections 36 of the arched guide members 30 are advanced over the edge of the uppermost step of the stairway to permit the rollers 62 to drop under the force of gravity after they extend past the edge of the uppermost step. If the rollers 62 do not drop substantially simultaneously within preset limits, forward motion of the wheelchair 10 is terminated and the user is alerted that the wheelchair 10 is not properly aligned with the stairway. Thus, the user must back up and try again. When the rollers 62 indicate that the wheelchair 10 is square with the steps, the sensor 58 is deployed from the front of the wheelchair 10 onto the uppermost steps to determine if the slope of the steps is within acceptable limits. If not, forward progress is terminated and the user must back up and will not be permitted to descend the overly steep stairway. Alternatively, if the slope is within acceptable limits, forward progress is permitted.

Advancement of the track assemblies 28 onto the top step causes the belts 34 of the arched guide member 30 to deflect upwardly so that a smooth transition from the horizontal landing to the incline of the steps is provided. See the previous discussion with respect to the functioning and operation of the upwardly deflecting belt 34 and the smooth transition provided thereby. After the wheelchair 10 is completely off the landing, the wheelchair 10 is propelled down the steps by the cleated belt 34 of the arched guide member 30. See FIG. 2. At the base of the steps, the front end section 36 of the arched guide member 30 contacts the landing surface at the base of the steps, and the wheelchair 10 is slowly returned to a horizontal orientation as the front end section 36 moves away from the bottom step. Ultimately, the tail section 32 engages the lowermost step and provides a smooth transition from the last step to the landing surface at the base of the steps. Upon completion of the descent, the wheels, 20 and 22, are lowered placing the track assemblies 28 in the inoperative storage condition. Thereafter, the rear wheels 20 of the wheelchair 10 are utilized to propel the wheelchair 10.

An ascending operation is similar to the above described descending operation. To this end, the track assemblies 28 are placed into an operative condition and the wheelchair 10 is advanced in a rearward direction toward the bottom step of the stairway. The tail sections 32 contact the lowermost step, and the contact is utilized by the sensors 64 to determine whether or not the wheelchair 10 is square with the step. If the wheelchair 10 is determined to be in proper alignment, the belt 56 of the tail sections 32 engage the lowermost step and drive the wheelchair 10 up the step until the belt 34 of the arched guide member 30 come into contact with the steps. At this point, the belt 34 of the arched guide member 30 drives the wheelchair 10 up the steps, and the floating mercury switch 60 continually monitors whether or not the stairway is too steep to continue the ascent. As long as the slope of the stairway is determined to be within acceptable limits, the wheelchair 10 travels up the steps.

At the top of the stairway, the belts 34 of the arched guide members 30 deflect upwardly and conform to the shape of the top step to enable a smooth transition onto the landing at the top of the steps. Ultimately, the wheelchair exits the top step and the wheels 20 and 22 are extended downwardly placing the track assemblies 28 in the inoperative storage condition.

Various other structural and functional features are contemplated by the present invention. For instance, in the illustrated embodiments of the present invention the wheels 20 and 22 of the wheelchair 10 are connected to the frame 12 in a manner that permits the wheels 20 and 22 to be positioned between retracted and extended positions relative to the track assemblies 28. A pair of X-braces 66 connect the front and rear wheels 20 and 22 on each side of the wheelchair 10 to the frame 12 of the wheelchair 10. Each X-brace 66 includes a pair of legs, 68 and 70, that pivot in a scissors like manner at their interconnection 72. Thus, the legs, 68 and 70, can be pivoted to reduce the height of the X-brace 66 to thereby retract the wheels 20 and 22 relative to the track assemblies 28, and the legs, 68 and 70, can be pivoted to increase the height of the X-brace 66 to extend the wheels 20 and 22 below the track assemblies 28. Preferably, a single powered cylinder 74 is located under the seat 14 and is utilized to control the pivoting action of both X-braces 66, and preferably, the interconnection 72 of the legs, 68 and 70, of each X-brace 66 is located directly above the peak 46 of the arched section 40 of the guide member 30. The X-braces also enable the seat of the wheelchair to be raised higher than normal by expanding the X-braces past their normal position for the purpose of extending the users reach.

According to an alternative embodiment (not shown), the wheels 20 and 22 can be at fixed positions relative to the seat 14, and the track assemblies 28 themselves are interconnected to the seat 14 such that the track assemblies are directly retracted and expanded into storage and/or operative positions.

Figure 5:
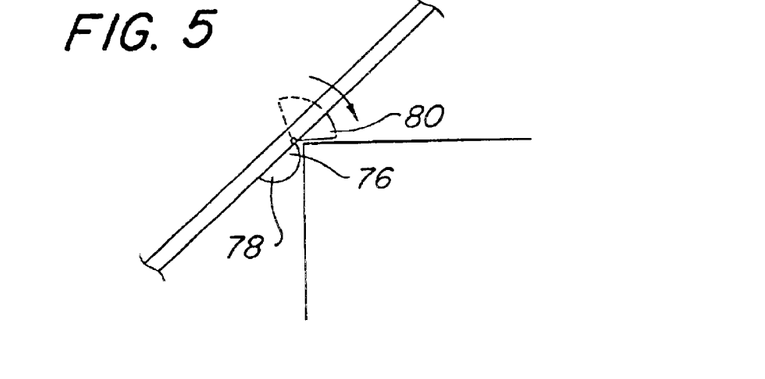
FIG. 5 is a view of an alternate cleat that can positively grip the corner of a step.

Preferably, the endless belts, 34 and 56, are simple cleated belts as illustrated in FIGS. 1–4. The size and shape of the cleats can vary as desired. A contemplated alternative of a cleat shown in FIG. 5 has a gripping mechanism that positively grips the corner of each step. To this end, each cleat 76 is formed by a first rounded section 78 projecting outwardly from the belt and a second section 80 that pivots relative to the first rounded section 78. The cleat sections 78 and 80 are resiliently biased into a closed position in which they are urged into engagement with a corner of a step and are reset-able into an open position prior to their engagement with a corner of a step. Thus, when the first section 78 contacts the step, the second section 80 is triggered to close in a mouse trap like manner to engage the opposite side of the corner of a step to thereby positively grip the step providing enhanced gripping of the steps by the belt. On the return of the cleats to the rollers, the cleat sections 78 and 80 are reset into the open position. Preferably, identical cleats 76 are staggered on the belt to ensure that at least one cleat grips each step of a stairway regardless of the spacing of the steps.

Preferably, the belts, 34 and 56, of both track assemblies 28 are powered by a single battery powered motor 84. To this end, an axial (not shown) can be used to impart rotation to the rollers 44 and 54 of the guide member 30 and tail section 32 located at the rear end 38 of the guide member 30. In addition, each rear wheel 20 of the wheelchair can be powered by its own battery powered motor (not shown). Preferably, the wheelchair 10 has a pair of rechargeable batteries 86 that powers all of the above referenced motors.

Preferably, the wheels, 20 and/or 22, of the wheelchair 10 are provided as split rim tires (not shown) having a replaceable inflatable bladder and replaceable outer tread covering to maximize the useful life of the wheelchair 10 irrespective of the life of the tires. In addition, preferably the wheelchair 10 has a rubber drag link (not shown) to prevent the build up of static electricity which would otherwise shock the user and/or damage the controls of the wheelchair. Further, preferably the wheelchair 10 is provided as a non-collapsible long-lasting unit having permanently attached track assemblies 28. Alternatively, the wheelchair can be provided as a collapsible wheelchair.

Another novel aspect of the present invention is that the wheelchair 10 has a built-in integral wireless phone 92. Preferably, the wireless phone 92 is built into and hard wired within one of the armrests 18 of the frame 12 as illustrated in FIG. 1. An antenna for the phone 92 can be embedded within an upright part of the frame 12, and the phone or the controls for the phone 92 are conveniently located on the armrest 18. The phone enables ready 911 emergency access and the use of GPS systems so that the location of the wheelchair caller can be readily determined by the 911 operator.

Figure 3:
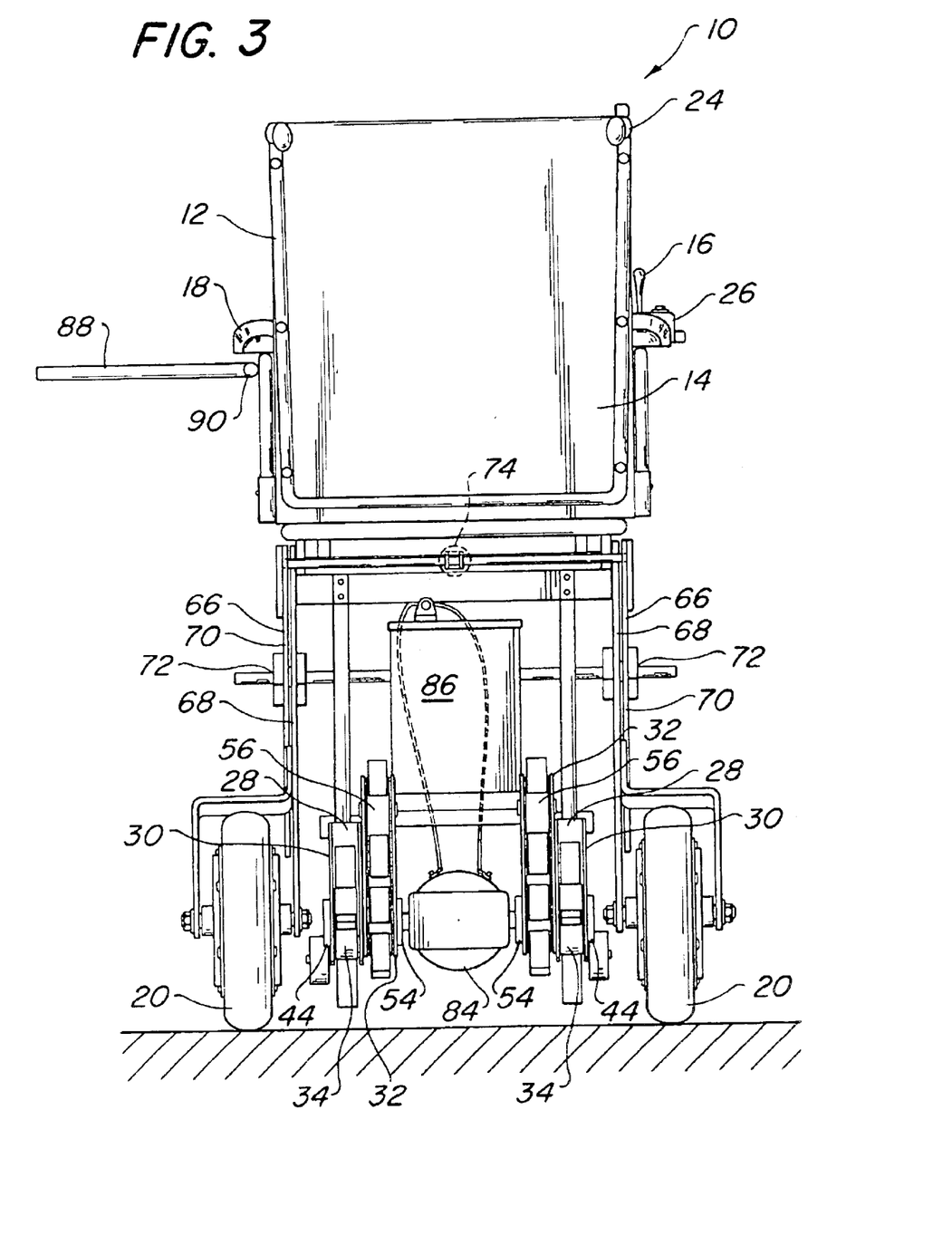
FIG. 3 is a rear elevational view of the wheelchair in FIG. 1 with the stair-climbing track assemblies in a non-operative mode.

Yet another novel aspect of the present invention is that the wheelchair 10 has an integrally attached transfer board 88 to provide ready transfer of an individual into and out of the seat 14 of the wheelchair 10. As best illustrated in FIG. 3, the transfer board 88 formed as a part of the armrest 18 and thus, is permanently attached to the frame 12 of the wheelchair 10 so that the transfer board 88 can be positioned vertically in a storage position when not needed, and horizontally into a transfer position when required. For example, a part of the armrest forming the transfer board can be telescopically expanded and then folded outwardly via a hinged connection. The transfer board 88 is preferably made of plastic, wood, metal or other sturdy material.

A still further novel aspect of the present invention is that the wheelchair 10 has a control panel 26 which provides a single controller, such as a joystick 16, to control the operations of the wheelchair 10 in both a normal operating condition and in a stair-climbing operating condition. The joystick 84 is utilized to control movement of the wheelchair 10 in all directions when in a normal operating condition. When the user activates the stair-climbing track assemblies 28, the same joystick 16 is utilized to control the ascent or descent of the wheelchair along a stairway, and various lights adjacent to the joystick 16 indicate a go or no-go condition as discussed previously. The control panel 26 also includes a low battery warning light as well as an on/off switch. In addition, the control panel 26 can include a mileage counter and/or an hour usage counter for purposes of providing reminders to bring the wheelchair in for preventive maintenance service. Further, it is important that the components of the control panel 26 be selected and configured so as not to be capable of being harmed by the operation of the cell phone 92 or other electronic devices.

In cases in which the wheelchair 10 is being provided to industrial customers, such as airlines or the like, certain other features can be added to the wheelchair. For example, a separate control panel 94 can be located on the hand bars 24, so that a stewardess or the like can override the controls on the armrest 18 to move an individual as desired. In addition, a breath analyzing unit 96 can be added to the armrest 18 to require the user to breath through a straw and pass an alcohol breath test before the controls on the armrest 18 are permitted to be activated. Still further, the wheelchair 10 can be secured together with special fasteners (not shown) which can only be unfastened with a special tool to prevent a user from removing or disassembling parts of the wheelchair. To this end, the fasteners can be screws or bolts with a hollow center or keyway requiring a unique tool for unscrewing the fastener.

The above described track assemblies 28 can also be utilized in non-wheelchair devices. For example, the track assemblies 28 according to the present invention can be used on a remote control and/or unmanned device used to traverse obstacles. For example, such devices may be utilized in the exploration of planets or areas having unsafe or rocky terrain, in mine field cleaning operations, in remote control bomb squad operations, in hazardous material handling operations and in like unmanned operations.

While a preferred wheelchair has been described in detail, various modifications, alterations, and changes may be made without departing from the spirit and scope of the wheelchair according to the present invention as defined in the appended claims.

What is claimed is:

1. A stair-climbing wheelchair having a seat, a frame supporting the seat, and a set of wheels on which the wheelchair can be propelled, the improvement comprising:
   a spaced-apart pair of elongate track assemblies mounted to said frame extending underneath said seat between said set of wheels in a front to back direction relative to the wheelchair, in an inoperative storage condition said track assemblies being spaced above a surface on which the wheelchair is supported by said set of wheels and in an operative drive condition said track assemblies engaging a surface on which the wheelchair is supported for purposes of transporting the wheelchair along a path of travel to thereby enable the wheelchair to descend and ascend an obstacle;
   each of said track assemblies including an elongate guide member carrying an endless belt, said guide member having front and rear end sections each supporting a roller over which said endless belt is mounted for rotation about said rollers, said guide member being upwardly arched between said end sections thereby permitting said endless belt to deflect upwardly between said rollers when said endless belt engages an obstacle; and
   said frame including a pair of X-shaped members that interconnect said set of wheels of the wheelchair to said seat of the wheelchair, each X-shaped member including a pair of legs that pivot at their interconnection in a scissors like motion to extend said set of wheel of the wheelchair below said track assemblies to place said track assemblies in said inoperative storage condition and to retract said set of wheels above said track assemblies to place said track assemblies in said operative drive condition.

2. A stair-climbing wheelchair according to claim 1, wherein said endless belt on each of said track assemblies extends in a taut condition on said rollers, and wherein at least one of said rollers is movably mounted on said guide member to provide said endless belt with an amount of slack to enable said endless belt to deflect upwardly between said rollers and out of a substantially straight line path when said endless belt engages an obstacle.

3. A stair-climbing wheelchair according to claim 2, wherein said at least one roller is resiliently biased by a spring mechanism so that said endless belt is maintained in a taut condition at all times including when said belt is deflected upwardly between said rollers.

4. A stair-climbing wheelchair according to claim 3, wherein said at least one roller is mounted and moveable within a slot formed in said guide member, and wherein said spring mechanism resiliently biases said at least one roller in a direction away from the other roller on which the endless belt is mounted.

5. A stair-climbing wheelchair according to claim 1, wherein each of said track assemblies includes an upwardly inclined tail section extending from said rear end section of said arched elongate guide member, and wherein each tail section includes a pair of rollers about which an endless belt revolves.

6. A stair-climbing wheelchair according to claim 5, wherein said endless belt in said arched elongate guide member and said endless belt in said tail section in each of said track assemblies are separate belts, and wherein one of said rollers of said arched elongate guide member and one of said rollers of said tail section of each of said track assemblies rotate about a common axis.

7. A stair-climbing wheelchair according to claim 6, wherein said tail section of each of said track assemblies is offset inwardly of said arched elongate guide member such that said tail sections of said track assemblies are spaced closer together than said arched elongate guide members of said track assemblies.

8. A stair-climbing wheelchair having a seat, a frame supporting the seat, and a set of wheels on which the wheelchair can be propelled, the improvement comprising:
   a spaced-apart pair of elongate track assemblies mounted to said frame extending underneath said seat between said set of wheels in a front to back direction relative to the wheelchair, in an inoperative storage condition said track assemblies being spaced above a surface on which the wheelchair is supported by said set of wheels and in an operative drive condition said track assemblies engaging a surface on which the wheelchair is supported for purposes of transporting the wheelchair along a path of travel to thereby enable the wheelchair to descend and ascend an obstacle; and
   each of said track assemblies including an elongate guide member carrying an endless belt, said guide member having front and rear end sections each supporting a roller over which said endless belt is mounted for rotation about said rollers;

wherein said frame of the wheelchair includes a pair of X-shaped members that interconnect said set of wheels of the wheelchair to said seat of the wheelchair, and wherein each X-shaped member includes a pair of legs that pivot at their interconnection in a scissors like motion to extend said set of wheels of the wheelchair below said track assemblies to place said track assemblies in said inoperative storage condition and to retract said set of wheels above said track assemblies to place said track assemblies in said operative drive condition.

9. A stair-climbing wheelchair according to claim 1, wherein said X-shaped members are caused to be expanded or retracted by a powered expandable and retractable cylinder located under said seat.

10. A stair climbing wheelchair according to claim 1, wherein said legs of said X-braces interconnect substantially directly above a peak of said upwardly arched guide members.

11. A stair-climbing wheelchair according to claim 1, wherein said endless belts each have a plurality of outwardly extending cleats.

12. A stair-climbing wheelchair according to claim 11, wherein said cleats have movable sections which positively grip about the coRNer of steps.

13. A stair-climbing wheelchair according to claim 1, wherein each of said track assemblies includes a pair of sensors to determine whether or not a slope of said path of travel is too steep for safe passage, one of sensors being deployed from a front of the wheelchair and one being located adjacent a rear of the wheelchair.

14. A stair-climbing wheelchair according to claim 1, wherein said track assemblies include sensors to determine whether or not the wheelchair is in proper alignment with respect to the obstacle to safely descend/ascend the obstacle.

15. A stair-climbing wheelchair having a seat, a frame supporting the seat, and a set of wheels on which the wheelchair can be propelled, the improvement comprising:

a spaced-apart pair of elongate track assemblies mounted to said frame extending underneath said seat between said set of wheels in a front to back direction relative to the wheelchair, in an inoperative storage condition said track assemblies being spaced above a surface on which the wheelchair is supported by said set of wheels and in an operative drive condition said track assemblies engaging a surface on which the wheelchair is supported for purposes of transporting the wheelchair along a path of travel to thereby enable the wheelchair to descend and ascend an obstacle; and each of said track assemblies including an elongate guide member carrying an endless belt, said guide member having front and rear end sections each supporting a roller over which said endless belt is mounted for rotation about said rollers, said guide member being upwardly arched between said end sections thereby permitting said endless belt to deflect upwardly between said rollers when said endless belt engages an obstacle;

wherein said track assemblies include sensors to determine whether or not the wheelchair is in proper alignment with respect to the obstacle to safely descend/ascend the obstacle, wherein said alignment sensors include a pair of gravity roller devices that are located adjacent a front of said wheelchair and that drop as the track assemblies extend over an edge of an uppermost step of the obstacle, and wherein said alignment sensors include a pair of contact sensor that are located adjacent a rear of said wheelchair and that are activated when said track assemblies initially engage a lowermost step of the obstacle.

16. A stair-climbing wheelchair according to claim 1, wherein, when said track assemblies are positioned into said operative drive position, said seat of the wheelchair is tilted rearwardly relative to said track assemblies.

17. A stair-climbing wheelchair according to claim 1, wherein the wheelchair has a battery motor that drives said endless belts and wherein said set of wheels of the wheelchair include a pair of rear wheels that are each driven by separate battery powered motors.

18. A stair-climbing wheelchair according to claim 17, further comprising a control unit mounted on an armrest of the wheelchair, said control unit including a joystick which is utilized to control operations of said motors and to control switching of said track assemblies between said inoperative storage condition and said operative drive condition.

19. A stair-climbing wheelchair according to claim 18, wherein said control unit includes a breath analyzer unit and wherein said frame includes hand bars having an override control unit.

20. A stair-climbing wheelchair according to claim 1, wherein the wheelchair has an armrest to which a cellular phone is attached.

21. A stair-climbing wheelchair according to claim 1, further comprising a transfer board permanently secured to the wheelchair.

22. A stair-climbing wheelchair according to claim 21, wherein said transfer board forms a part of an armrest of the wheelchair and is positionable between a vertically disposed storage position and a horizontally disposed operative position.

23. A stair-climbing wheelchair having a seat, a frame supporting the seat, and a set of wheels on which the wheelchair can be propelled, the improvement comprising:

a spaced-apart pair of elongate track assemblies mounted to said frame extending underneath said seat between said set of wheels in a front to back direction relative to the wheelchair, in an inoperative storage condition said track assemblies being spaced above a surface on which the wheelchair is supported by said set of wheels and in an operative drive condition said track assemblies engaging a surface on which the wheelchair is supported for purposes of transporting the wheelchair along a path of travel to thereby enable the wheelchair to descend and ascend an obstacle;

each of said track assemblies including an elongate guide member carrying an endless belt, said guide member having front and rear end sections each supporting a roller over which said endless belt is mounted for rotation about said rollers, said guide member being upwardly arched between said end sections thereby permitting said endless belt to deflect upwardly between said rollers when said endless belt engages an obstacle; and each of said endless belts having a plurality of cleats, each cleat including a first section that is stationary relative to said endless belt and that projects outwardly from said endless belt and a moveable second section that pivots relative to said first section and said endless belt, said first section functioning as a trigger such that, when said fist section contacts a corner of a step, the second section pivots and is resiliently biased in a direction toward said first section and the step so that the step is simultaneously engaged by both said first and second sections of said cleat and is gripped therebetween.

* * * * *